United States Patent [19]

Fitzpatrick et al.

[11] Patent Number: 5,319,382
[45] Date of Patent: Jun. 7, 1994

[54] METHOD AND APPARATUS FOR MANIPULATING A FULL MOTION VIDEO PRESENTATION IN A DATA PROCESSING SYSTEM

[75] Inventors: Gregory P. Fitzpatrick, Fort Worth; Marvin L. Williams, Lewisville, both of Tex.

[73] Assignee: International Business Machines Corporation, Armonk, N.Y.

[21] Appl. No.: 998,989

[22] Filed: Dec. 31, 1992

[51] Int. Cl.⁵ .............................................. G09G 1/06
[52] U.S. Cl. ...................... 345/118; 345/115; 348/571
[58] Field of Search ............... 340/721; 358/147, 141, 358/183; 345/113, 115, 118

[56] References Cited

U.S. PATENT DOCUMENTS

| | | | |
|---|---|---|---|
| 4,559,533 | 12/1985 | Bass et al. | 340/721 |
| 4,956,872 | 9/1990 | Kimura | 358/183 |
| 5,008,750 | 4/1991 | Gomikawa | 358/147 |

Primary Examiner—Alvin E. Oberley
Assistant Examiner—Vivian Chang
Attorney, Agent, or Firm—Duke W. Yee; Andrew J. Dillon; David A. Mims, Jr.

[57] ABSTRACT

A method and system which permits a user to selectively manipulate a display of a full motion video presentation within a data processing system, wherein the full motion video presentation is comprised of a number of frames containing picture elements arranged in rows and columns. The video presentation frames are sequentially displayed within the data processing system. Thereafter, a region of interest within each of a selected number of the frames of the full motion video presentation are designated. The picture elements contained within the region of interest within each of the selected frames are stored. Then, the picture elements from the region of interest within the plurality of frames may be independently manipulated during a sequential display of the frames of the full motion video presentation within the data processing system, wherein a display of a region of interest within a full motion video presentation may be independently manipulated.

18 Claims, 7 Drawing Sheets

METHOD AND APPARATUS FOR MANIPULATING A FULL MOTION VIDEO PRESENTATION IN A DATA PROCESSING SYSTEM

BACKGROUND OF THE INVENTION

1. Technical Field

The present invention relates in general to improved data processing systems and in particular to a method and system for manipulating a video image in a data processing system. Still more particularly, the present invention relates to a method and system for manipulating selected regions of interest within a full motion video presentation in a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine these multiple information formats into a coherent and comprehensive presentation to the user.

Multimedia presentations may include full motion video presentations displayed within the data processing system. Often times, a user may be able to manipulate a full motion video presentation. For example, in a presentation involving two video sources, a first full motion video presentation may occupy a first region of interest, while a second full motion video presentation object occupies a second region of interest within the display of the data processing system. Each full motion video presentation may originate from a different video source. A user may manipulate one region of the display without effecting the other region. Such manipulation is possible since two distinct full motion video presentations from different video sources are utilized. A single full motion video presentation from a single video presents a different situation.

A single full motion video presentation may often contain more than one dynamic, logical element, or region of interest. Each region of interest may be of interest to the user in varying degrees at different times. Problems typically occur when the user desires to manipulate (e.g., review) one of the regions of interest, while allowing other regions or other logical elements to continue uninterrupted. Currently, unlike the presentation of two full motion video presentations, when utilizing a single full motion video presentation, the user must reverse or rewind the entire full motion video presentation in order to review one of the regions of interest. Consequently, the flow of the single full motion video presentation is interrupted.

One example of this situation is a television news program from a single video source in which one region of interest includes a traditional news report, while a second region of interest includes a fast-scrolling stock market ticker-tape report. If the user wishes to continue watching the real-time news report while "backing up" to view a particular stock quote that has already been presented, there is currently no way to accomplish these objectives concurrently.

Therefore, it would be desirable to have a method and system for manipulating different regions of interest in a full motion video presentation in a data processing system.

SUMMARY OF THE INVENTION

It is therefore one object of the present invention to provide an improved data processing system.

It is another object of the present invention to provide an improved method and system for manipulating a video image in a data processing system.

It is yet another object of the present invention to provide an improved method and system for manipulating selected regions of interest in a full motion video presentation in a data processing system.

The foregoing objects are achieved as is now described. The present invention permits a user to selectively manipulate a display of a full motion video presentation within a data processing system, wherein the full motion video presentation is comprised of a number of frames containing picture elements arranged in rows and columns. The video presentation frames are sequentially displayed within the data processing system. Thereafter, a region of interest or regions of interest within each of a selected number of the frames of the full motion video presentation are designated. The picture elements contained within the region of interest within each of the selected frames are stored. Then, the picture elements from the region of interest within the plurality of frames may be independently manipulated during a sequential display of the frames of the full motion video presentation within the data processing system, wherein a display of a region of interest within a full motion video presentation may be independently manipulated.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
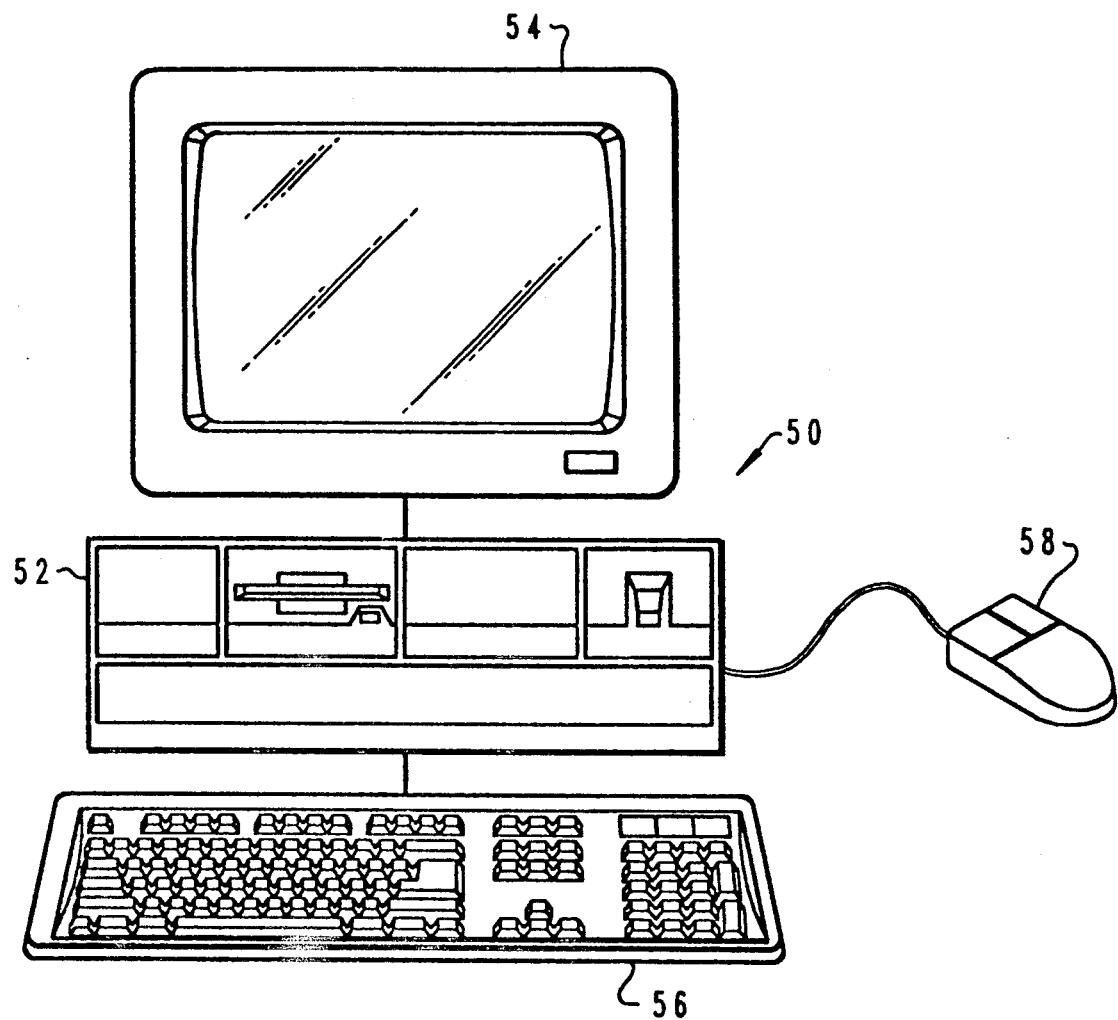
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
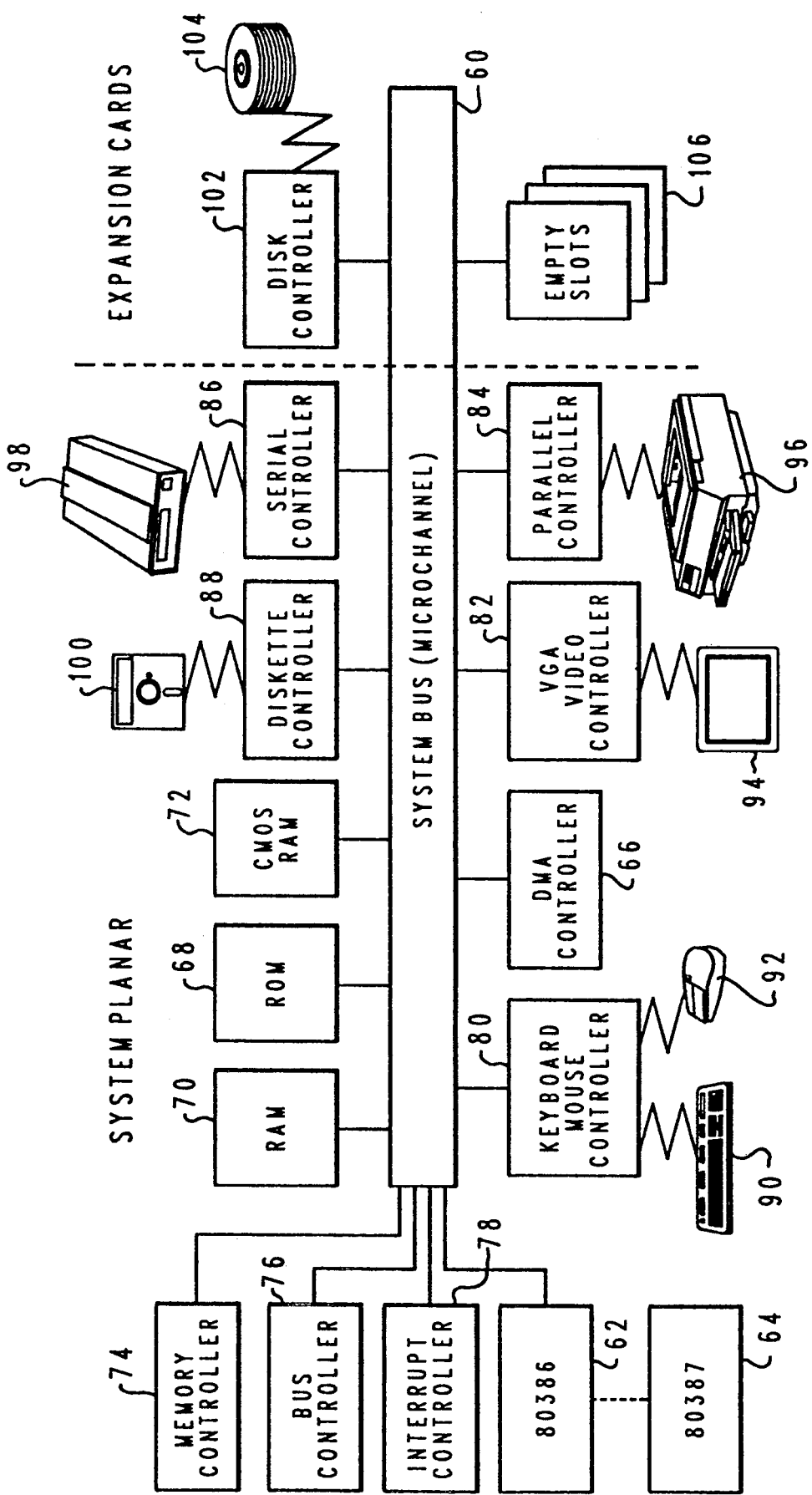
FIG. 2 depicts a block diagram of selected components in the personal computer illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
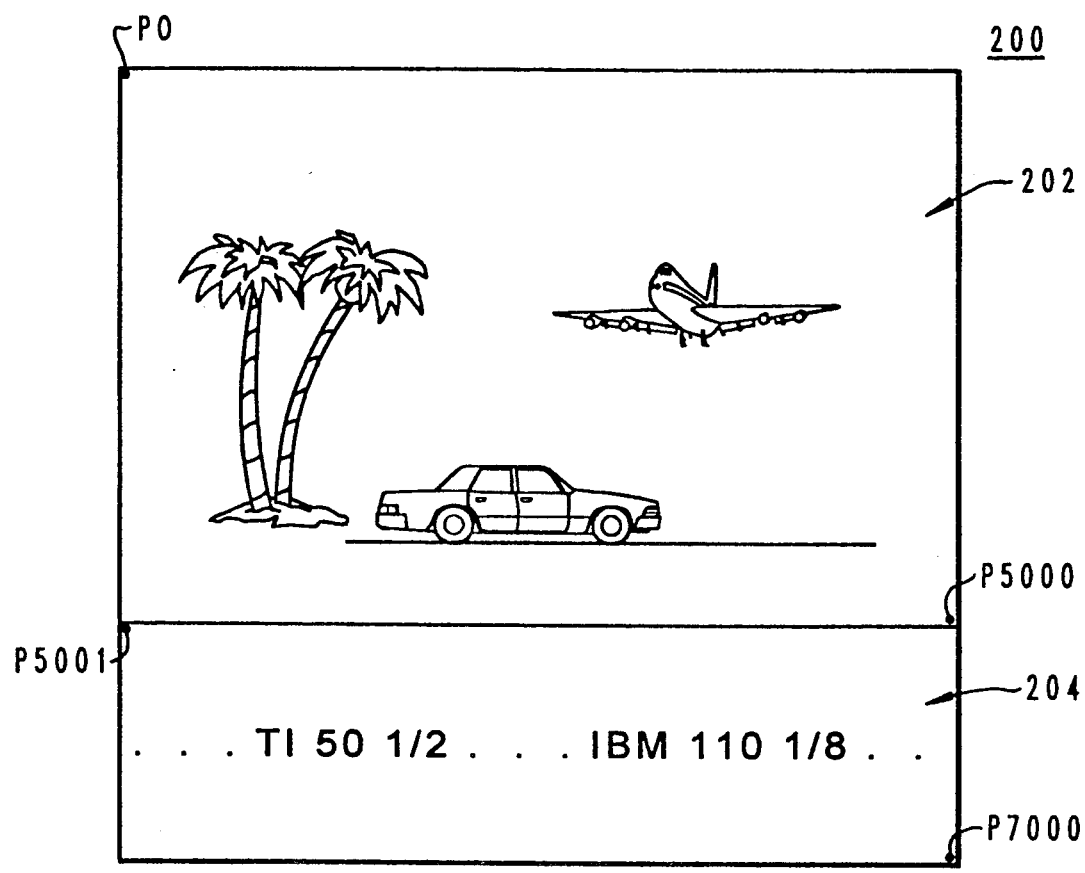
FIG. 3 is a pictorial representation of a display with a data processing system of a single frame of a full motion video presentation originating from a single source, in accordance with a preferred embodiment of the present invention.

FIG. 3 is a pictorial representation of a display of a full motion video presentation originating from a single source. Display 200 is a display of a single frame of a full motion video presentation from a single video source. Two regions of interest in this example are regions of interest 202 and 204. Region of interest 202 is a motion video scene from a news report while region of interest 204 depicts stock market quotations moving across display 200 in a so-called "crawl" presentation. Display 200 contains a number of picture elements, also called pels or pixels, defining the two regions. P0 is the video RAM offset for the first pixel in region of interest 202 while P5000 is the video RAM offset for the last pixel in region of interest 202. Region of interest 204 begins at video RAM offset P5001 and ends at video RAM offset P7000. These video RAM offset values are utilized to display pixels on display 200.

In accordance with a preferred embodiment of the present invention, a user may manipulate either of these two regions of interest while allowing the other region of interest to continue in an uninterrupted manner. For example, a user could "rewind" region of interest 204 and look at a quotation that already has been displayed while continuing to view region of interest 202. Although display 200 depicts only two regions of interest, many other regions of interest could be defined by a user having either visual or non visual boundaries within full motion video presentation, which is received as a single presentation from a video source, in accordance with a preferred embodiment of the present invention.

Figure 4A:
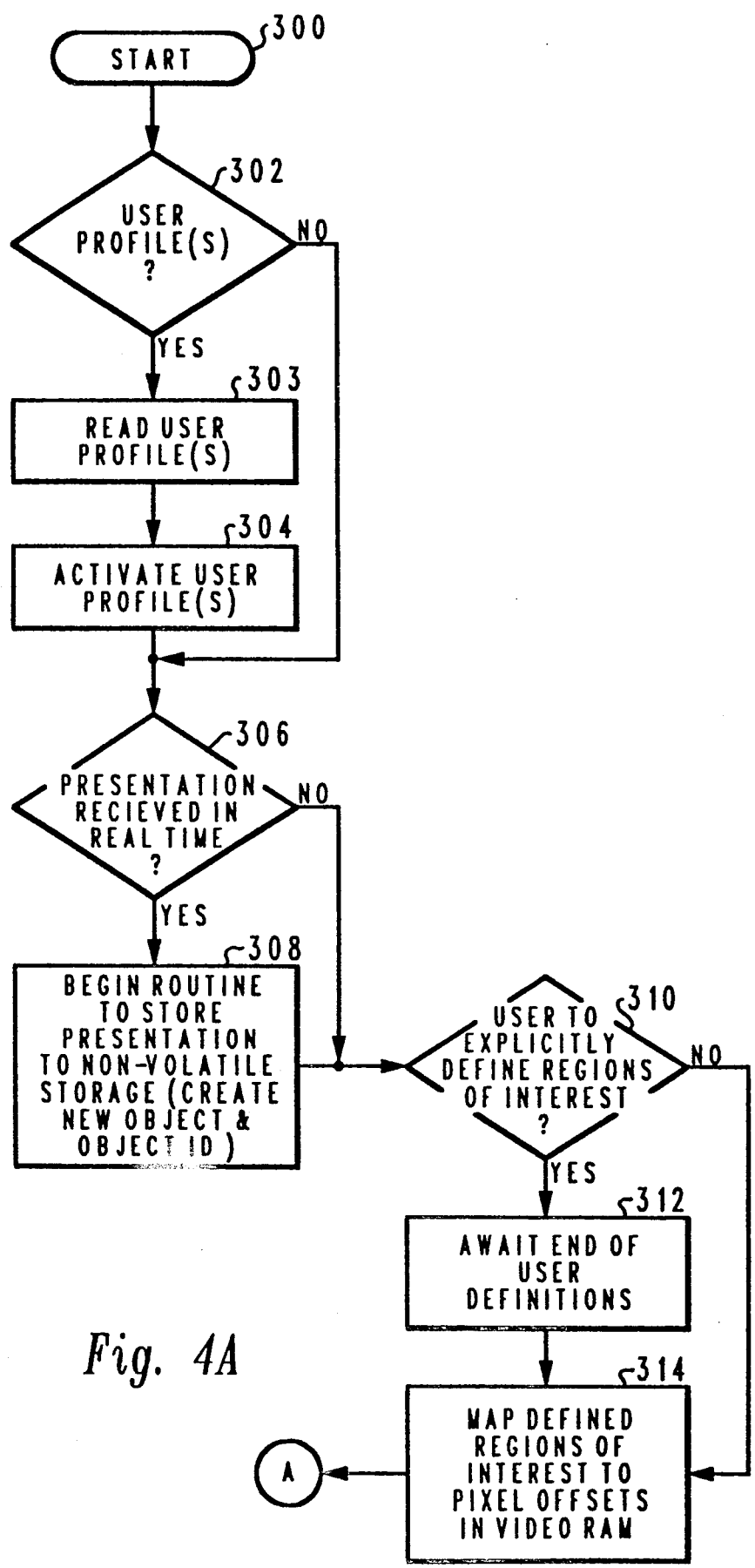
FIGS. 4A-4C form a high level flow chart of a method and system for manipulation of regions of interest within a full motion video presentation in accordance with a preferred embodiment of the present invention.
Figure 4B:
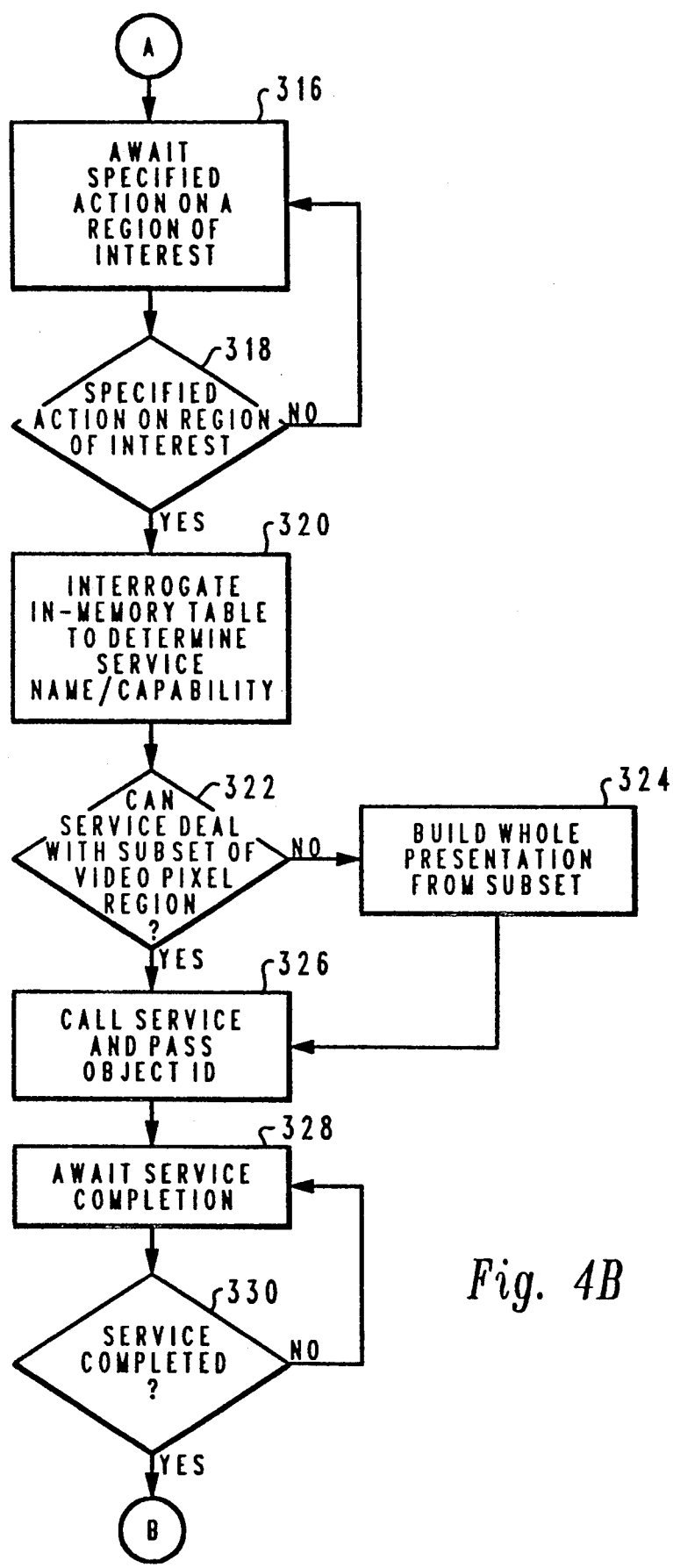
Figure 4C:
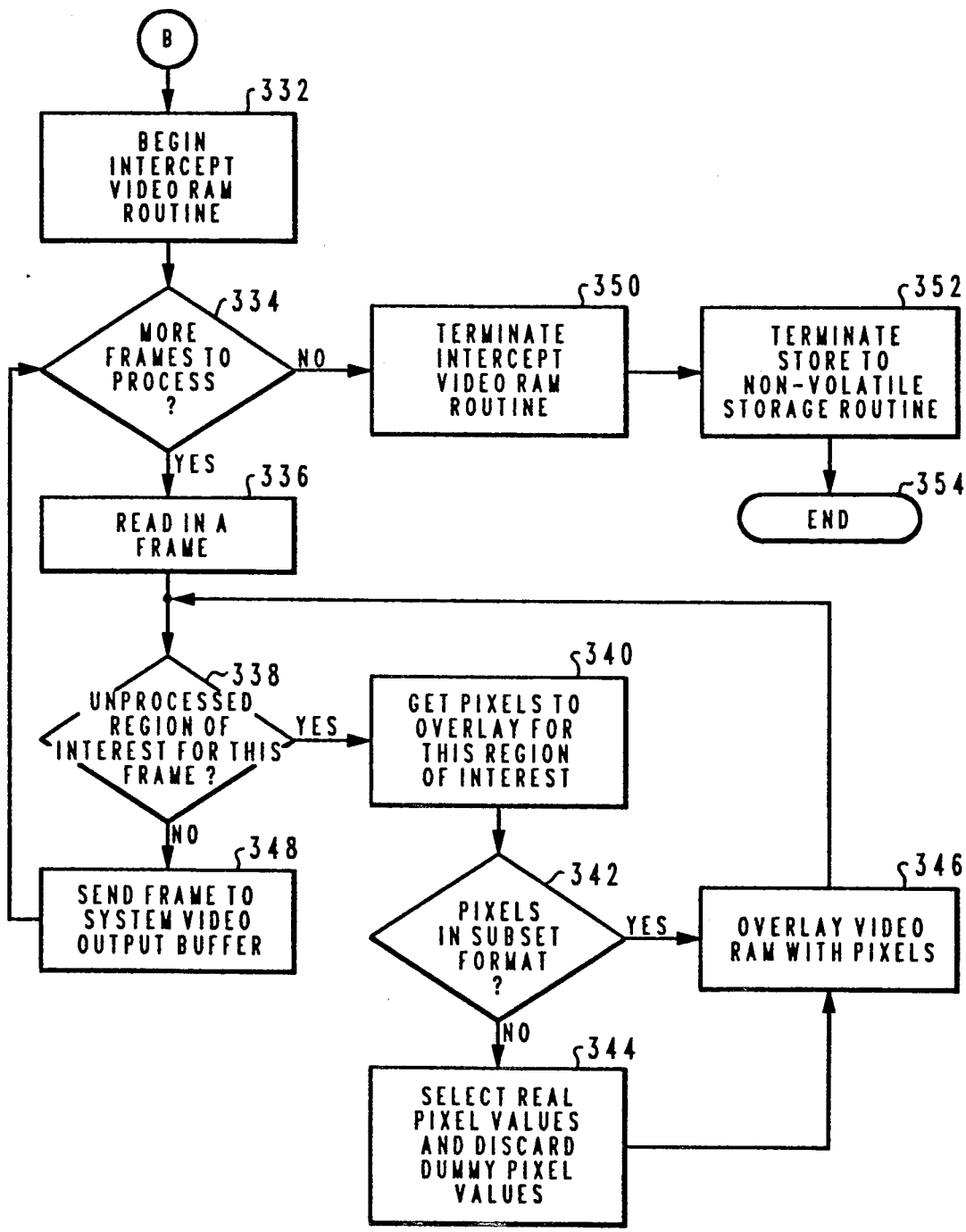

FIGS. 4A, 4B, and 4C depict a high level flowchart of a method and system for manipulation of regions of interest within a full motion video presentation in accordance with a preferred embodiment of the present invention. The process begins as illustrated in block 300 and thereafter, proceeds to block 302, which depicts a determination of whether or not user profiles exist. A user profile, as utilized with the method and system of the present invention, includes various definitions which may be utilized with a full motion video presentation. For example, these definitions may include predefined regions of interest, an identification of the signal source for the full motion video presentation, or the time and date of the full motion video presentation's creation. Additionally, the definitions may define a logical relation between an input channel, a time of day and date, and selected regions of interest. If user profiles are present, the process then passes to block 303, which illustrates the accessing of the user profiles. Thereafter, the process proceeds to block 304, which depicts the activation of such user profiles for use in processing the full motion video presentation. A full motion video presentation may be recorded without a user being present and regions of interest may be preselected by accessing a user profile for later use or manipulation by the user upon playing back the full motion video presentation in accordance with a preferred embodiment of the present invention.

Thereafter, the process proceeds to block 306. Block 306 illustrates a determination of whether or not a full motion video presentation is being received in real time. Referring again to block 302, if user profiles are not present, the process proceeds directly to block 306.

If the full motion video presentation is being received in real time, the process proceeds to block 308. Block 308 illustrates the beginning of a routine to store the full motion video presentation as an object within a non-volatile storage device. Such storage routines are well known to those skilled in the art. Additionally, other types of volatile storage, such as RAM may also be utilized, in accordance with a preferred embodiment of the present invention. The full motion video presentation is preferably comprised of a number of video frames. These frames are preferably stored in the non-volatile storage, in accordance with a preferred embodiment of the present invention. A new object and object identification (object ID) are created for the frames which are stored within the non-volatile storage device.

Thereafter, the process proceeds to block 310, which depicts a determination of whether or not the user desires to explicitly define regions of interest within the full motion video presentation. The user may define regions of interest within the data processing system via a graphic user interface utilizing a graphic pointing device, such as a mouse, track ball, light pen, touch screen or the like, in accordance with a preferred embodiment of the present invention. Keyboard entries may also be utilized to define regions of interest. Referring again to block 306, if no active user profiles are present, the process passes to directly block 310. If the user desires to explicitly define regions within the full motion video presentation, the process proceeds to block 312. Block 312 illustrates asynchronously awaiting the end of the user definitions, defining regions of interest. The defining of regions of interest utilizing a profile or user input is a technique which is well known to those skilled in the art.

Thereafter, the process passes to block 314. Block 314 depicts the mapping of the defined regions of interest to individual picture elements or pixel offsets within the video RAM. Referring again to block 310, if the user does not desire to explicitly define regions of interest, the process proceeds directly to block 314. Thereafter, the process proceeds to block 316 via connector A. Block 316 illustrates awaiting a specified action on a region of interest. Various specified actions may be selected by a user for performance on a region of interest, such as rewind, slow motion, or pause. Various other actions or manipulations also may be performed on various regions of interest in a manner well known to those skilled in the art. The process then proceeds to block 318, which depicts a determination of whether or not a specified action on a region of interest has occurred. If no action has occurred the process continues to wait, as illustrated at block 318.

Upon the occurrence of a specified action on a region of interest, the process proceeds to block 320, which illustrates the interrogating of an in-memory table, in order to determine the service name and capability of the service which corresponds to the specified action. The in-memory table preferably provides an index to determine what service should be called in response to a specified action on a region of interest. Thereafter, the process proceeds to block 322, which depicts a determination of whether or not the service can operate upon a subset of the video pixel region within the region of interest. If the service cannot operate upon subsets of the video pixel region, the process proceeds to block 324, which illustrates the building of an entire full motion video presentation, utilizing the subset of the video pixel region. For each video frame, pixel values from the region of interest are stored in an object, along with dummy values for the remainder of each video frame. Thereafter the process passes to block 326, which depicts the invocation of the service and passing of object ID to the service.

Referring again to block 322, if the service corresponding to the action specified is capable of operating upon subsets of the video pixel region, the process proceeds directly to block 326. "Services", as defined herein, include various well known functions for manipulating moving video presentations such as, for example, rewind, slow motion, and pause. Thereafter, the process passes to block 328. Block 328 illustrates asynchronously waiting for the service to complete processing the full motion video presentation. The process passes to block 330, which depicts a determination of whether or not the service has been completed. If the service has not been completed, the process returns to block 328.

Upon completion of the service, the process proceeds to block 332 via connector B. Block 332 illustrates the beginning of a so-called "intercept video RAM" routine which is well known to those skilled in the art. The process thereafter proceeds to block 334, which depicts a determination of whether or not additional frames are present for processing. If additional frames are present for processing, the process proceeds to block 336, which illustrates the reading in of a frame from the video source, prior to display of the frame to a user. Thereafter, the process proceeds to block 338, which depicts a determination of whether or not additional unprocessed regions exist for this frame. If more unprocessed regions of interest exist for the frame, the process then passes to block 340. Block 340 illustrates the obtaining of picture elements or pixels to overlay for a region of interest. The process then proceeds to block 342, which illustrates a determination of whether or not the pixels are in a subset format. A "subset format" is a format in which the pixels are stored as received, without modification. If the pixels are not in a subset format, the process proceeds to block 344, which illustrates selecting the real pixel values and the discarding of the dummy pixel values.

Thereafter, the process proceeds to block 346, which depicts the overlaying of the video RAM with those pixels which are necessary to produce a modified frame for display to the user. Afterward, the process returns to block 338. Referring again to block 342, if the pixels are in a subset format the process directly passes to block 346, as described above. Referring again to block 338, if no unprocessed regions of interest exist for this frame, the process then proceeds to block 348, which illustrates the transmitting of the frame to the system video output buffer for display to the user. Afterward, the process returns to block 334 for a determination of whether or not additional frames exist for processing.

If no additional frames exist for processing, the process then passes to block 350. Block 350 depicts the termination of the intercept video RAM routine. The process then passes to block 352, which illustrates the termination of the store to nonvolatile storage routine. Thereafter the process terminates, as illustrated in block 354.

Figure 5:
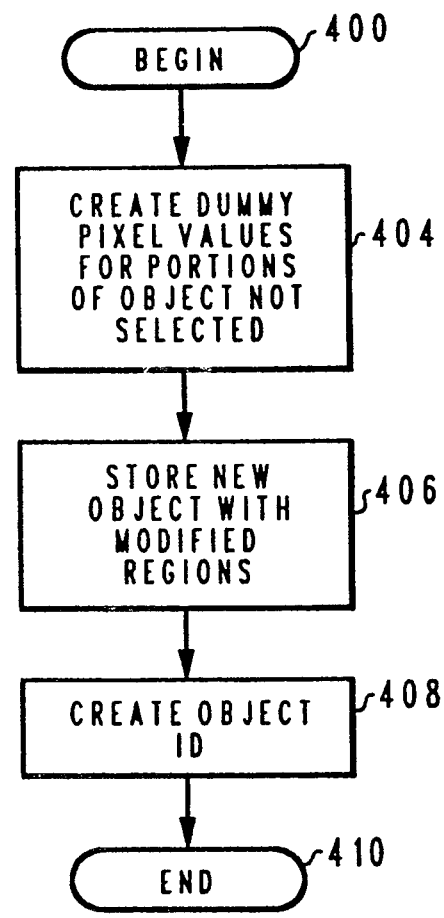
FIG. 5 depicts a high level flow chart of a method and system for creating an object from a subset of the video pixel region as illustrated in block 324 in FIG. 4B.

FIG. 5 is a high level flow chart of a method and system for creating an object from a subset of the video pixel region, as illustrated in block 324 in FIG. 4B. This method and system is utilized when a service is unable to process a full motion video presentation in a subset format. As depicted, the process begins in block 400 and thereafter passes to block 402, which illustrates the creation of dummy pixel values for regions of the full motion video presentation which are not selected by the user. The process then proceeds to block 406, which depicts the storing of the new full motion video presentation with the altered regions as an object. Thereafter, the process proceeds to block 408, which illustrates the creation of an object ID for the new full motion video presentation object. Afterward, the process terminates, as depicted in block 410.

Although the depicted embodiment stores entire frames, subsets of pixels defining a region of interest may be stored independently, without storing an entire video frame. Such an approach may be employed for various reasons, such as conserving storage media.

One advantage provided by the present invention is the capability of permitting a user to view a region of a full motion video presentation object in an uninterrupted manner, while simultaneously manipulating other regions of interest independently of the uninterrupted region. Another advantage provided by the present invention is the capability of utilizing existing multimedia manipulation services well known to those skilled in the art, without modifications. Furthermore, audio elements within a multimedia presentation may continue to be presented in an uninterrupted manner, while the video portion of the presentation is manipulated.

Although the depicted embodiment illustrates designating a region of interest through user input or an active user profile, regions of interest may also be logically defined, utilizing sophisticated pattern-recognition methods and processes.

While the invention has been particularly shown and described with reference to a preferred embodiment, it will be understood by those skilled in the art that various changes in form and detail may be made therein without departing from the spirit and scope of the invention.

What is claimed is:

1. A method for selectively manipulating a display of a full motion video presentation from a single video source within a data processing system, wherein said full motion video presentation is comprised of a plurality of frames containing a plurality of picture elements arranged in rows and columns, said method comprising the data processing system implemented steps of:

sequentially displaying said plurality of frames in said full motion video presentation from a single video source within said data processing system;

designating a region of interest within each of a selected ones of said plurality of frames of said full motion video presentation;

storing a plurality of picture elements within said region of interest within said selected ones of said plurality of frames of said full motion video presentation displayed within said data processing system; and independently manipulating display of said plurality of picture elements within said region of interest during said sequential display of said plurality of frames within said data processing system, wherein display of said plurality of picture elements within said region on interest occurs independently of said display of said plurality of frames outside of said designated region of interest, wherein a display of designated regions of interest within a full motion video may be manipulated.

2. The method for selectively manipulating a display of full motion video presentation according to claim 1, wherein said step of independently manipulating said plurality of picture elements from said region of interest includes modifying said plurality of frames by replacing said plurality of picture elements within said region of interest with a selected number of said plurality of stored picture elements.

3. The method for selectively manipulating a display of a full motion video presentation according to claim 2, wherein said designating step includes receiving user input defining said region of interest.

4. The method for selectively manipulating a display of a full motion video presentation according to claim 2, wherein said designating step includes designating said region of interest in response to a profile defining said region of interest.

5. The method for selectively manipulating a display of a full motion video presentation according to claim 2, wherein said designating step includes automatically designating said region of interest in response to a selected pattern within said region of interest.

6. The method for selectively manipulating a display of a full motion video presentation according to claim 2, wherein said storing step includes storing said plurality of picture elements within said region of interest in a memory.

7. The method for selectively manipulating a display of a full motion video presentation according to claim 2, wherein said step of independently manipulating said plurality of picture elements from said region of interest within said plurality of frames during said sequential display of said plurality of frames within said data processing system includes manipulating said plurality of picture elements in response to a selection of an action by a user.

8. A data processing system for selectively manipulating a display of a full motion video presentation from a single video source within said data processing system, wherein said full motion video presentation is comprised of a plurality of frames containing a plurality of picture elements arranged in rows and columns, said data processing system comprising:

display means for sequentially displaying said plurality of frames in said full motion video presentation from a single video source within said data processing system;

designation means for designating a region of interest within each of a selected ones of said plurality of frames of said full motion video presentation;

storage means for storing said plurality of picture elements within said regions of interest within said selected ones of said plurality of frames of said full motion video presentation displayed within said data processing system; and manipulation means for independently manipulating said plurality of picture elements during said sequential display of said plurality of frames within said data processing system, wherein display of said plurality of picture elements within said region on interest occurs independently of said display of said plurality of frames outside of said designated region of interest, wherein a display of designated regions of interest within a full motion video may be manipulated.

9. The data processing system of claim 8, wherein said manipulation means for independently manipulating said plurality of picture elements from said region of interest includes modification means for modifying said plurality of frames by replacing said plurality of picture elements within said region of interest with a selected number of said plurality of stored picture elements.

10. The data processing system of claim 9, wherein said designation means includes means for receiving user input defining said region of interest.

11. The data processing system of claim 9, wherein said designation means includes means for designating said region of interest in response to a profile defining said region of interest.

12. The data processing system of claim 9, wherein said designation means includes means for automatically designating said region of interest in response to a selected pattern within said region of interest.

13. The data processing system of claim 9, wherein said storage means includes means for storing said plurality of picture elements within said region of interest in a memory.

14. The data processing system of claim 9, wherein said manipulation means includes means for manipulating said plurality of picture elements in response to a selection of an action by a user.

15. A method for selectively manipulating a display of a full motion video presentation from a single video source within a data processing system, wherein said full motion video presentation is comprised of a plurality of frames containing a plurality of picture elements arranged in rows and columns, said method comprising the data processing implemented steps of:

sequentially displaying said plurality of frames in said full motion video presentation from a single video source within said data processing system;

designating a region of interest in response to a user input during sequential display of said plurality of frames in said full motion video presentation form a single video source;

responsive to said user input, selecting number of frames from said plurality of frames being sequentially displayed;

storing a number of picture elements sets, wherein each picture element set includes picture elements from within said region of interest for each of said selected number of frames; and manipulating display of said number of picture elements sets within said region of interest, wherein said manipulated display of said picture element sets within said region of interest occurs independently from said sequential display of said plurality of frames outside of said region of interest.

16. The method of claim 15, wherein said step of independently manipulating said number of picture elements sets from said region of interest, includes manipulating said plurality of picture elements in response to a selection of an action by a user.

17. The method of claim 16, wherein said step of manipulating said plurality of picture elements in response to a selection of an action by a user includes sequentially redisplaying said number of picture element sets within said region of interest while said plurality of frames continues sequential display outside of said region of interest.

18. The method of claim 16, wherein said step of manipulating said plurality of picture elements in response to a selection of an action by a user includes redisplaying a selected one of said number of picture element sets within said region of interest while said plurality of frames continues sequential display outside of said region of interest.

* * * * *